(12) United States Patent
Naito et al.

(10) Patent No.: US 8,792,225 B2
(45) Date of Patent: Jul. 29, 2014

(54) PARTITIONED REACTION CONTAINER FOR MANUFACTURING CAPACITOR ELEMENT INCLUDING OPENABLE AND CLOSABLE PASSAGE

(75) Inventors: Kazumi Naito, Tokyo (JP); Masahiro Suzuki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/517,387

(22) PCT Filed: Dec. 8, 2010

(86) PCT No.: PCT/JP2010/071990
§ 371 (c)(1),
(2), (4) Date: Aug. 10, 2012

(87) PCT Pub. No.: WO2011/077950
PCT Pub. Date: Jun. 30, 2011

(65) Prior Publication Data
US 2012/0304430 A1 Dec. 6, 2012

(30) Foreign Application Priority Data

Dec. 21, 2009 (JP) ................................. 2009-288710

(51) Int. Cl.
*H01G 9/00* (2006.01)
(52) U.S. Cl.
USPC .......................... 361/523; 29/25.03; 29/25.41
(58) Field of Classification Search
USPC ............... 29/25.03, 25.41–25.42, 592.1, 434; 361/321.1, 523–541; 438/761; 118/697, 720, 728
See application file for complete search history.

(56) References Cited

U.S. PATENT DOCUMENTS

| 4,934,033 A | * | 6/1990 | Harakawa et al. ............ 29/25.03 |
| 5,330,578 A | * | 7/1994 | Sakama et al. ............ 118/723 R |
| 6,463,649 B1 | * | 10/2002 | Lai et al. ......................... 29/434 |
| 7,005,008 B2 | * | 2/2006 | Knebel et al. ................. 117/206 |
| 2006/0051928 A1 | | 3/2006 | Naito et al. |
| 2012/0304430 A1 | * | 12/2012 | Naito et al. .................. 29/25.41 |

FOREIGN PATENT DOCUMENTS

| JP | 02-298010 A | 12/1990 |
| JP | 03-22516 A | 1/1991 |
| JP | 03-163816 A | 7/1991 |
| JP | 04-56445 B2 | 9/1992 |
| JP | 06-82592 B2 | 10/1994 |
| JP | 07-22080 B2 | 3/1995 |
| JP | 4049804 B2 | 2/2008 |
| WO | 2006/028286 A1 | 3/2006 |
| WO | 2007/049688 A1 | 5/2007 |

OTHER PUBLICATIONS

Official Communication issued in International Patent Application No. PCT/JP2010/071990, mailed on Mar. 15, 2011.

* cited by examiner

*Primary Examiner* — Minh Trinh
(74) *Attorney, Agent, or Firm* — Keating & Bennett, LLP

(57) ABSTRACT

A reaction container for manufacturing a capacitor element includes a container which accommodates electrolytic solution therein, a partitioning frame which can partition the inside of the container into a plurality of individual chambers, negative electrode members individually arranged in each of the individual chambers, and a constant-current source electrically connected to the cathode members. A passage, which enables movement of the electrolytic solution between each individual chamber and at least one individual chamber of the individual chambers adjacent to each individual chamber, is provided in a manner such that the passage can be opened and closed.

7 Claims, 7 Drawing Sheets

PARTITIONED REACTION CONTAINER FOR MANUFACTURING CAPACITOR ELEMENT INCLUDING OPENABLE AND CLOSABLE PASSAGE

TECHNICAL FIELD

The present invention relates to a reaction container for manufacturing a capacitor element capable of stably forming a uniform dielectric layer and a uniform semiconductor layer with respect to a plurality of conductive members while keeping the forming range constant, and also relates to a method of manufacturing a capacitor element.

BACKGROUND TECHNIQUE

A capacitor for use in, for example, a circuit for a CPU (Central Processing Unit) in a personal computer and the like is required to have high capacity and low ESR (Equivalent Series Resistance) to control voltage fluctuation and suppress heat generation during the passing of high ripple currents.

As a capacitor for use in a CPU circuit, an aluminum solid electrolytic capacitor and a tantalum solid electrolytic capacitor are known. As such solid electrolytic capacitor, it is known that the capacitor is constituted by one of electrodes (conductive member) made of an aluminum foil having minute pores in a surface layer or a sintered body formed by sintering tantalum powder having minute pores therein, a dielectric layer formed on the surface of the one of the electrodes, and the other electrode (typically, a semiconductor layer) formed on the dielectric layer.

As a forming method of a semiconductor layer of a capacitor in which the semiconductor layer constitutes the other electrode, methods using an energization method described in U.S. Pat. No. 1,868,722 (Patent Document 1), U.S. Pat. No. 1,985,056 (Patent Document 2), and U.S. Pat. No. 2,054,506 (Patent Document 3) are known. In all of the methods, a semiconductor layer is formed by immersing a conductive member having a dielectric layer on the surface thereof into semiconductor layer forming solution and applying voltage (passing electrical current) between the conductive member as an anode and a cathode prepared in the semiconductor layer forming solution.

Japanese Unexamined Laid-open Patent Application Publication No. 1-13-22516 (Patent Document 4) describes a method for forming a semiconductor layer by passing an electric current in which a DC bias current is superimposed on an alternating current through a conductive member having a dielectric layer. Further, Japanese Unexamined Laid-open Patent Application Publication No. H3-163816 (Patent Document 5) describes a method for forming a semiconductor layer on a chemical polymerization layer by having a conductive member come in contact with a chemical polymerization layer formed on the dielectric layer and electropolymerizing using the conductive member as an anode.

However, with the methods as described in Patent Documents 4 and 5, there were the following problems when simultaneously forming a semiconductor layer on each of a plurality of conductive members. That is, with the method described in Patent Document 4, a semiconductor layer is also formed on the cathode side and there is a problem that the formation condition of the semiconductor layer changes as the energizing time passes, and it was also difficult to evenly passing electric current through a plurality of conductive members. Further, with the method described in Patent Document 5, it is difficult to form a uniform semiconductor layer on the inside of each conductive member since energizing is conducted through a conductive member arranged on the outside and used as an anode. In the case of a large conductive member having small pores formed therein, it was especially difficult to form a uniform semiconductor layer.

In cases where a semiconductor layer is formed on the aforementioned conductive member in which a dielectric layer is formed by the energizing method, there were no problems when forming a semiconductor layer on each of a few conductive members. However, in the case of simultaneously forming a semiconductor layer on each of one hundred or more conductive members at an industrial level, since the individual conductive members are not always homogeneous, and the semiconductor forming speeds are different from each other depending on conductive members, especially when a semiconductor layer is formed simultaneously on a plurality of conductive members, the current value of the electricity flowing through each conductive member does not become constant, and it was sometimes difficult to manufacture capacitors having stable capacity since the formation condition of the semiconductor layer of the manufactured capacitor was uneven.

Therefore, the inventors proposed a reaction container having a configuration in which small reaction containers (compartments) corresponding to the individual conductive members were arranged (See Patent Documents 6 and 7).

PRIOR ART DOCUMENTS

Patent Document

Patent Document 1: Japanese Patent No. 1868722
Patent Document 2: Japanese Patent No. 1985056
Patent Document 3: Japanese Patent No. 2054506
Patent Document 4: Japanese Unexamined Laid-open Patent Application Publication No. H3-22516
Patent Document 5: Japanese Unexamined Laid-open Patent Application Publication No. H3-163816
Patent Document 6: WO2006/028286 Pamphlet
Patent Document 7: Japanese Patent Publication No. 4049804

SUMMARY OF THE INVENTION

Problems to be Solved by the Invention

However, in the case of using the reaction container partitioned into individual chambers as described in Patent Document 6, since the reaction liquid is independently consumed in each individual chamber and therefore attachment to the conductive member, drying, etc., progresses independently in each individual chamber, the time-dependent change of the liquid level in each compartment is not uniform, which causes a problem that the forming range of the dielectric layer or the semiconductor layer in each conductive member (anode member) cannot be maintained uniformly. Also, the density of the reaction solution differs between compartments, and there was a problem that dielectric layers and semiconductor layers with respect to each conductive member (anode member) could not be formed.

In addition, the reaction container as described in Patent Document 7 is provided with minute holes communicating adjacent compartments to adjust the liquid level in each compartment to the same height, but when, for example, chemical conversion treatment is performed using this reaction container, the potential difference between elements (between conductive members) is sometimes large especially at an initial stage, which causes the problem that electric current in the amount that cannot be ignored with respect to the homogenization of a dielectric layer leaks to other individual chambers (compartments) via the holes, or the problem that the degree of such leakage differs depending on the position of the individual chamber (compartment). As a result, the amount of electric current flowing through each conductive member varies and a uniform capacitor element cannot always be manufactured.

The present invention was made in view of the aforementioned technical backgrounds, and aims to provide a reaction container for manufacturing a capacitor element and a manufacturing method of a capacitor element, in which electrolytic reaction, such as, e.g., anodizing and electrolytic polymerization, can be performed for each conductive member disposed in each individual chamber (compartment) with a predetermined current value, and the liquid level in each individual chamber (compartment) of the container can be adjusted to the same height (the same level), and at the same time, a uniform dielectric layer or a uniform semiconductor layer can be stably formed on a plurality of conductive members while maintaining a constant forming range.

The present invention provides the following means to achieve the aforementioned objects.

Means for Solving the Problems

[1] A reaction container for manufacturing a capacitor element, comprising:
a container configured to accommodate electrolytic solution therein;
a partitioning frame configured to partition an inside of the container into a plurality of individual chambers;
cathode members individually disposed in each of the individual chambers; and
a passage provided in an openable and closable manner to allow movement of the electrolytic solution between one of the individual chambers and at least adjacent one of the individual chambers adjacent to the one of the individual chambers.

[2] The reaction container for manufacturing a capacitor element as recited in the aforementioned Item 1, wherein
the partitioning frame includes a lower partitioning frame formed on a bottom surface of the container in an upwardly protruded manner and an upper partitioning frame configured to come into contact with an upper surface of the lower partitioning frame in a liquid-tight manner,
the upper partitioning frame is configured to move in an up-and-down direction,
the inside of the container is partitioned into a plurality of individual chambers by arranging the upper partitioning frame on the upper surface of the lower partitioning frame, and
the passage is formed between the two partitioning frames by detaching the upper partitioning frame from the lower partitioning frame.

[3] The reaction container for manufacturing a capacitor element as recited in the aforementioned Item 2, wherein
a first contact plate portion is provided on an upper end of a partition wall of the lower partitioning frame, wherein an upper surface of the first contact plate portion is formed into a smooth surface and a width of the upper surface of the first contact plate portion is set to be larger than a thickness of the partition wall of the lower partitioning frame,
a second contact plate portion is provided on a lower end of a partition wall of the upper partitioning frame, wherein a lower surface of the second contact plate portion is formed into a smooth surface and a width of the lower surface of the second plate contact portion is set to be larger than a thickness of the partition wall of the upper partitioning frame, and
the inside of the container is partitioned into a plurality of individual chambers by arranging the upper partitioning frame on the upper surface of the lower partitioning frame in such a manner that the lower surface of the second contact plate portion of the upper partitioning frame is in contact with the upper surface of the first contact plate portion of the lower partitioning frame.

[4] The reaction container for manufacturing a capacitor element as recited in any one of the aforementioned Items 1 to 3, wherein a liquid passing space is provided inside a structural wall of the container.

[5] The reaction container for manufacturing a capacitor element as recited in any one of the aforementioned Items 1 to 4, further comprising a circuit board having a power supply capable of limiting voltage and electric current and electrically connected to the cathode member.

[6] The reaction container for manufacturing a capacitor element as recited in the aforementioned Item 5, wherein the circuit board is arranged at a bottom surface side of the container.

[7] The reaction container for manufacturing a capacitor element as recited in the aforementioned Items 5 or 6, wherein a component constituting the power supply is thermally connected to the container.

[8] The reaction container for manufacturing a capacitor element as recited in any one of the aforementioned Items 1 to 7, wherein the reaction container is used to form a dielectric layer on a surface of each of a plurality of conductive members by anodization by individually immersing each of the plurality of conductive members into chemical conversion treatment solution in each individual chamber.

[9] The reaction container for manufacturing a capacitor element as recited in any one of the aforeed Items 1 to 8, wherein the reaction container is used to form a semiconductor layer on a surface of a dielectric layer formed on a surface of each of the plurality of conductive members by individually immersing each of the plurality of conductive members in semiconductor layer forming solution in each individual chamber of the container.

[10] A method for manufacturing a capacitor element using the reaction container for manufacturing a capacitor element as recited in any one of the aforementioned Items 1 to 7, the method comprises:
a dielectric layer forming step for forming a dielectric layer on a surface of a conductive member by individually immersing the conductive member into chemical conversion treatment solution in each individual chamber of the reaction container for manufacturing a capacitor element, and in a state in which the passage is closed, passing electric current between the conductive member as an anode and the cathode member of the reaction container as a cathode; and
a liquid level adjusting step for adjusting a liquid level of the chemical conversion treatment solution by opening the passage of the reaction container.

[11] A method for manufacturing a capacitor element using the reaction container for manufacturing a capacitor element as recited in any one of the aforementioned Items 1 to 7, the method comprises:
a semiconductor layer forming step for forming a semiconductor layer on a surface of a dielectric layer of the conductive member by individually immersing the conductive member having the dielectric layer on the surface thereof into the semiconductor layer forming solution in each individual chamber of the reaction container for manufacturing a capacitor element, and in a state in which the passage is closed, passing electric current between the conductive member as an anode and the cathode member of the reaction container as a cathode; and a liquid level adjusting step for adjusting a liquid level of the semiconductor layer forming solution by opening the passage of the reaction container.

[12] A method for manufacturing a capacitor element using the reaction container for manufacturing a capacitor element as recited in any one of the aforementioned Items 1 to 7, the method comprises:

a dielectric layer forming step for forming a dielectric layer on a surface of a conductive member by individually immersing the conductive member into chemical conversion treatment solution in each individual chamber of the reaction container for manufacturing a capacitor element, and in a state in which the passage is closed, passing electric current between the conductive member as an anode and the cathode member of the reaction container as a cathode;

a liquid level adjusting step for adjusting a liquid level of the chemical conversion treatment solution by opening the passage of the reaction container;

a semiconductor forming step for forming a semiconductor layer on a surface of a dielectric layer of the conductive member by individually immersing the conductive member having the dielectric layer on the surface thereof obtained by the dielectric layer forming step in the semiconductor layer forming solution in each individual chamber of the reaction container for manufacturing a capacitor element, and in a state in which the passage is closed, passing electric current between the conductive member as an anode and the cathode member of the reaction container as a cathode; and a liquid level adjusting step for adjusting a liquid level of the semiconductor layer forming solution by opening the passage of the reaction container.

[13] The method for manufacturing a capacitor element as recited in any one of the aforementioned Items 10 to 12, wherein the liquid level adjusting step is performed in a non-electric current passing state.

[14] A method of manufacturing a capacitor, comprising:

electrically connecting electrode terminals to the conductive member and the semiconductor layer of the capacitor element obtained by the method as recited in any one of the aforementioned Items 10 to 13, respectively; and sealing the capacitor element except for a part of the electrode terminals.

Effects of the Invention

According to the invention as recited in the aforementioned item [1], since cathode members are respectively disposed in (connected to) each individual chamber of the reaction container, electrolytic reaction, such as, e.g., anodization or electrolytic polymerization, can be conducted in a state in which each conductive member (anode member) disposed in each individual chamber (compartment) is precisely controlled to a predetermined constant current value, and a uniform dielectric layer and a uniform semiconductor layer can be formed with respect to a plurality of conductive members (anode members). Also, since a passage that allows the movement of electrolytic solution between one of individual chambers and at least adjacent one of the individual chambers adjacent to the one of individual chamber is provided, the height of the liquid level in each individual chamber (compartment) can be adjusted to the same height (the same level) by opening the passage to keep the forming range of the dielectric layer and the semiconductor layers constant, and uniformity (for example, uniformity of concentration) of the electrolytic solution in each compartment can also be adjusted by opening the passage, uniform capacitor elements can be manufactured.

According to the invention as recited in the aforementioned item [2], since the partitioning frame includes a lower partitioning frame formed on a bottom surface of the container in an upwardly protruded manner and an upper partitioning frame configured to come in contact with an upper surface of the lower partitioning frame in a liquid-tight manner, and the upper partitioning frame can be moved in an up-and-down direction, which allows the inside of the container to be partitioned into a plurality of individual chambers by arranging the upper partition frame on the upper surface of the lower partitioning frame to close the passage, electrolytic reaction, such as, e.g., anodization or electrolytic polymerization, can be conducted in a state in which each conductive member (anode member) disposed on each individual chamber (compartment) is precisely controlled to a predetermined constant current value.

On the other hand, the passage can be formed (passage can be opened) between the two partitioning frames by detaching the upper partitioning frame from the lower partitioning frame. Such opening of the passage enables adjustment of the liquid level of each chamber (compartment) to the same height (the same level) and adjustment of uniformity (for example, uniformity of density) of electrolytic solution in each chamber.

Also, since the lower partitioning frame is joined to the bottom surface of the container, the container can be further strengthened (reinforced).

According to the invention as recited in the aforementioned item [3], since a large area of the upper surface (the contact surface) of the first contact plate portion provided at the upper end of a partition wall of the lower partitioning frame and a large area of the bottom surface of the second contact plate portion provided at the lower end of a partition wall of the upper partitioning frame can be secured, the contact area of the two contact surfaces becomes larger, and therefore sufficient liquid-tight state can be secured when arranging the upper partitioning frame on the upper surface of the lower partitioning frame.

According to the invention as recited in the aforementioned item [4], since a liquid passing space is provided inside a structural wall of the container, the temperature of the electrolytic solution (chemical conversion treatment solution, semiconductor layer forming solution, etc.) inside the container can be controlled very accurately by passing liquid, such as, e.g., water, at a constant temperature through the liquid passing space.

According to the invention as recited in the aforementioned item [5], since the reaction container for manufacturing a capacitor element further includes a circuit board having a power supply capable of limiting voltage and electric current and electrically connected to the cathode member, there is an advantage that the conductive member (anode member) only needs to be connected to a simple metal plate (a metal elongated plate, etc.) not having an electric circuit (a simple metal plate not having an electric circuit can be used as a capacitor element manufacturing jig).

According to the invention as recited in the aforementioned item [6], since the circuit board is arranged at a bottom surface side of the container, the reaction container device can be made more compact and the container can be strengthened, especially the bottom surface of the container can be strengthened (reinforced).

According to the invention as recited in the aforementioned item [7], since a component (especially semiconductor component) constituting the power supply is thermally connected to the container in which the temperature is controlled, the temperature of the components constituting these power supplies can be controlled to some degree and the operational state of the power supply can be stabilized, and a more uniform dielectric layer and semiconductor layer can be formed.

According to the invention as recited in the aforementioned item [8], a reaction container that can form a dielectric layer that is uniform with respect to a plurality of conductive members (anode members) is provided.

According to the invention as recited in the aforementioned item [9], a reaction container capable of forming a uniform semiconductor layer with respect to a plurality of conductive members (anode members) in which dielectric layers are formed on the surface thereof, is provided.

According to the invention as recited in the aforementioned item [10], since anodizing reaction can be conducted in a state in which each conductive member (anode member) disposed in each individual chamber (compartment) of the reaction container is accurately controlled to a predetermined constant current value, and a uniform dielectric layer with respect the plurality of conductive members (anode members) can be formed, and since the forming range of the dielectric layer of each conductive member (anode member) can be maintained constant by adjusting the liquid level of each individual chamber (compartment) to the same height by opening the passage of the partitioning member, a number of uniform capacitor elements can be manufactured.

According to the invention as recited in the aforementioned item [11], electrolytic polymerization can be conducted in a state in which each conductive member (anode member) disposed in each individual chamber (compartment) of the reaction container is accurately controlled to a predetermined constant current value, and a uniform semiconductor layer with respect the plurality of conductive members (anode members) can be formed, and since the forming range of the semiconductor layer of each conductive member (anode member) can be maintained constant by adjusting the liquid level of each individual chamber (compartment) to the same height by opening the passage of the partitioning member, a number of uniform capacitor elements can be manufactured.

According to the invention as recited in the aforementioned item [12], anodizing and electrolytic polymerization can be conducted in a state in which each conductive member (anode member) disposed in each individual chamber (compartment) of the reaction container is accurately controlled to a predetermined constant current value, and a uniform dielectric layer and a uniform semiconductor layer with respect the plurality of conductive members (anode member) can be formed, and since the forming range of the dielectric layer and semiconductor layer of each conductive member (anode member) can be maintained constant by adjusting the liquid level of each individual chamber (compartment) to the same height by opening the passage of the partitioning member, a number of uniform capacitor elements can be manufactured.

According to the invention as recited in the aforementioned item [13], since the aforementioned liquid level adjusting step is performed in a non-electric current passing state, a number of uniform capacitor elements can be manufactured.

According to the invention as recited in the aforementioned item [14], a number of high quality capacitors having a uniform function can be manufactured.

EMBODIMENTS FOR CARRYING OUT THE INVENTION

Figure 1:
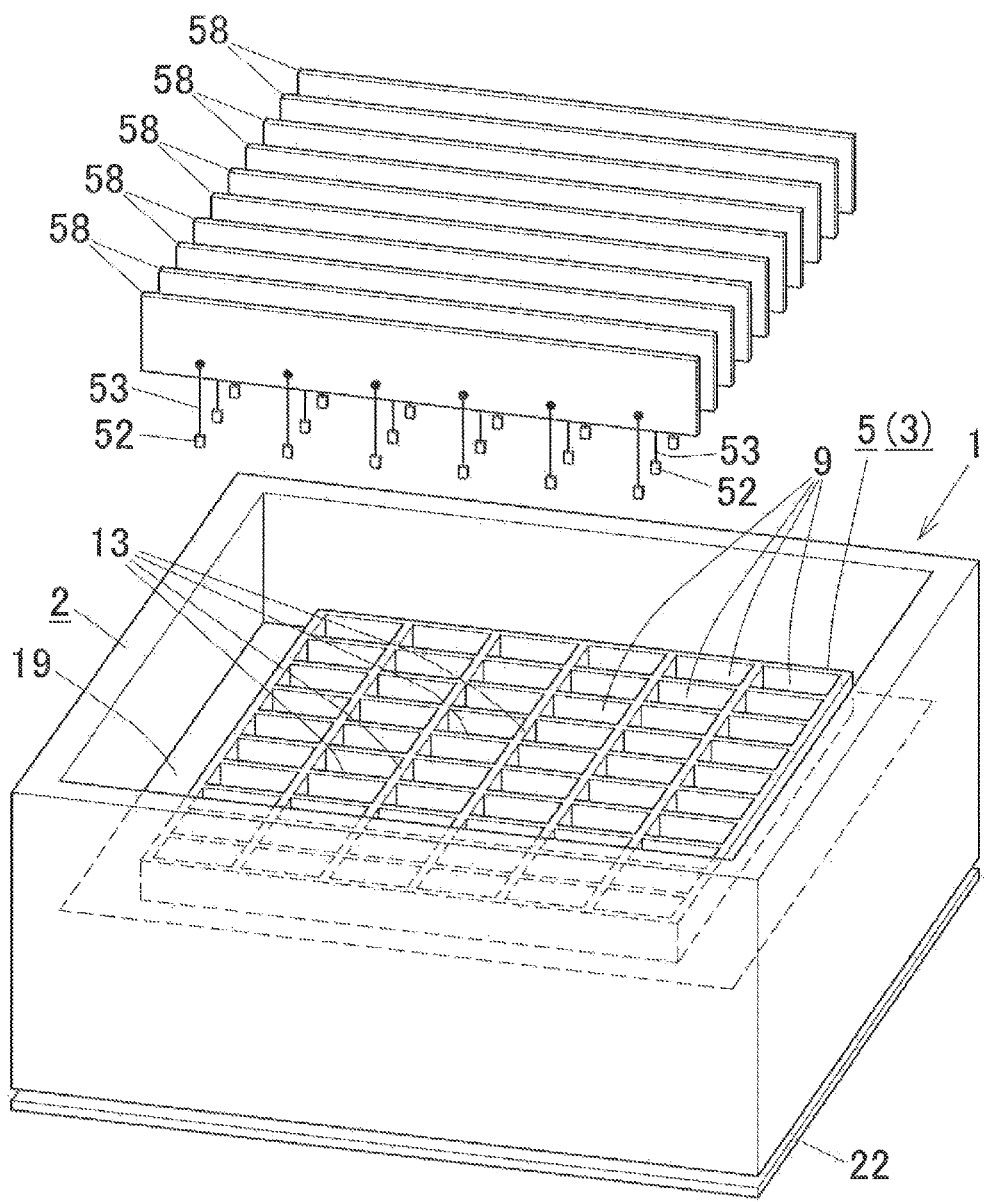
FIG. 1 is a perspective view showing an embodiment of the reaction container for manufacturing a capacitor element according to the present invention, together with a capacitor element manufacturing jig.
Figure 2:
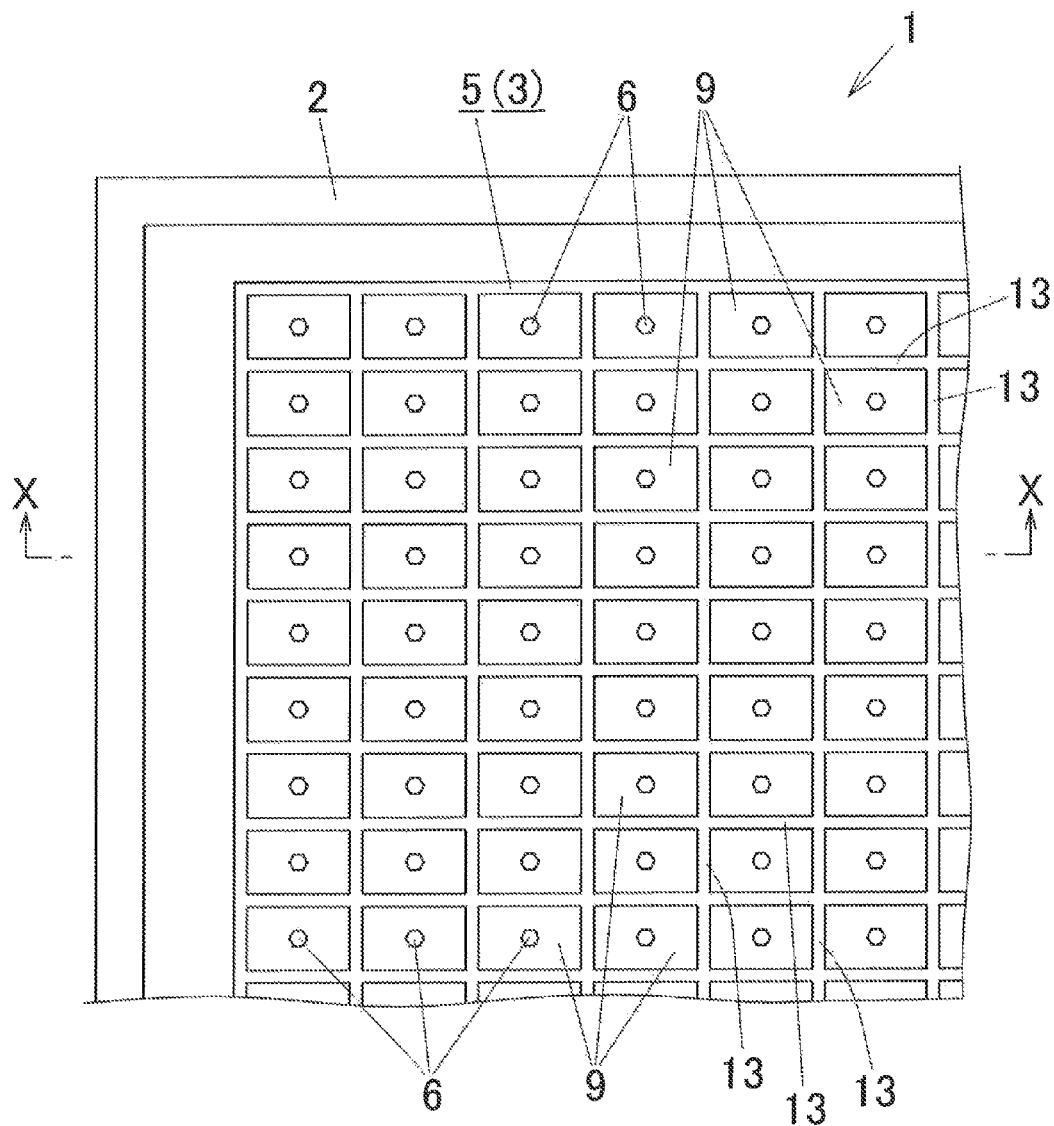
FIG. 2 is a top view of the reaction container for manufacturing capacitor element.
Figure 3:
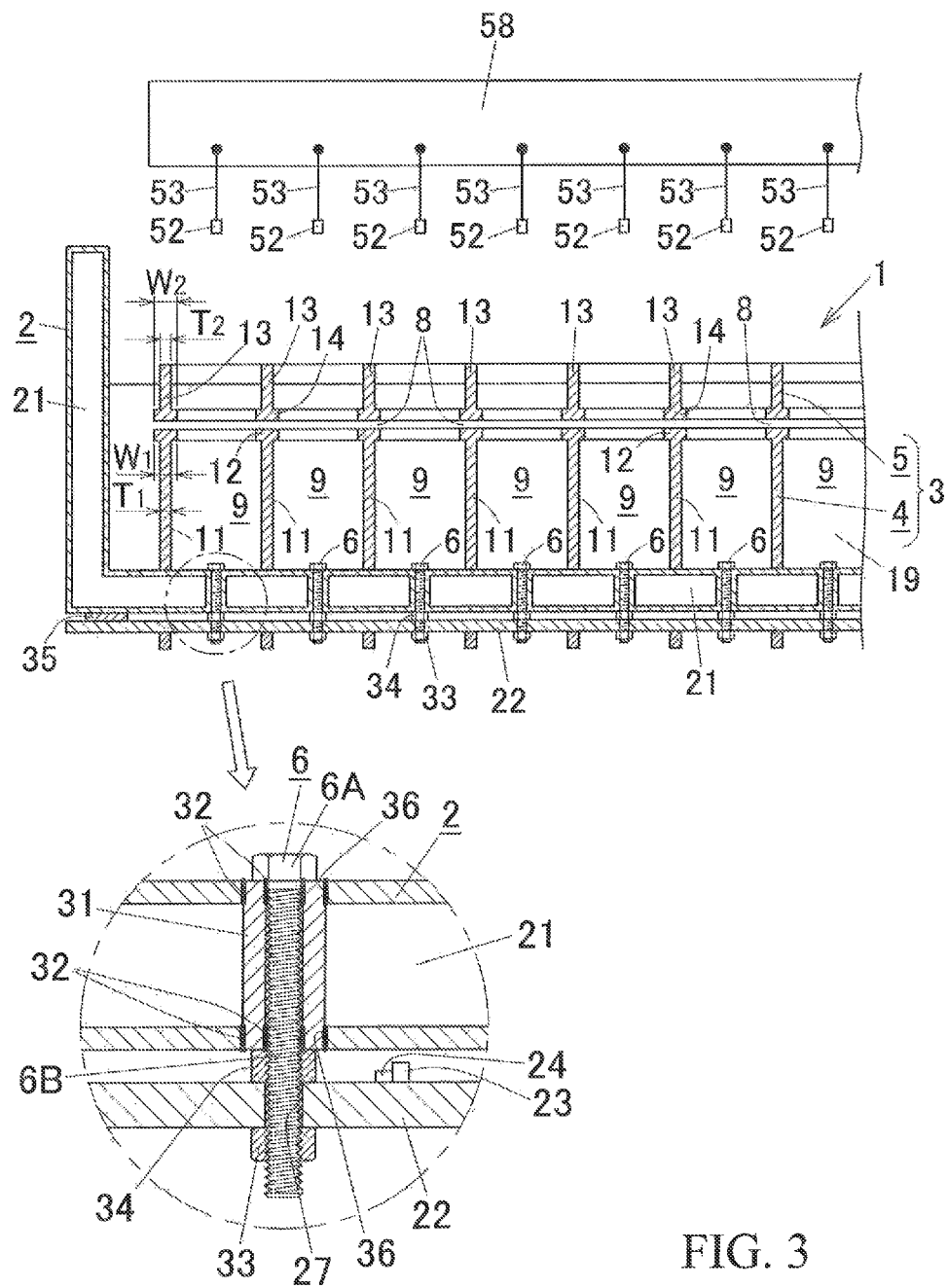
FIG. 3 is a cross-sectional view taken along the line X-X of FIG. 2 (showing together with the capacitor element manufacturing jig)

One embodiment of a reaction container 1 for manufacturing a capacitor element according to the present invention is shown in FIGS. 1 to 3. The reaction container 1 for manufacturing a capacitor element is provided with a container 2, a partitioning frame 3, cathode members 6, and a voltage and current controllable power source 7.

The container 2 is a container or a case capable of accommodating electrolytic solution (chemical conversion treatment liquid, semiconductor layer forming solution, etc.) therein. In this embodiment, the container 2 is formed into an approximately rectangular parallelepiped shape with the upper end opened and is formed by insulation material such as resin (acrylic resin, etc.) (see FIG. 1).

The container 2 has a jacket structure. That is, as shown in FIG. 3, the container 2 is provided with a liquid passing space 21 communicating the inside of the four side walls and the inside of the bottom wall. By passing a temperature controlled liquid (e.g., heated water) through the liquid passing space 21, the temperature of the electrolytic solution (chemical conversion treatment liquid, semiconductor layer forming solution, etc.) accommodated in the container 2 can be controlled with a high degree of accuracy.

The partitioning frame 3 includes a lower partitioning frame 4 protruded upward from the bottom wall of the container 2 and an upper partitioning frame 5 capable of coming into contact with the upper surface of the lower partitioning frame 4 in a liquid-tight manner (see FIG. 3). The lower partitioning frame 4 and the upper partitioning frame 5 are each formed by insulating material such as resin (acrylic resin, etc.). The upper partitioning frame 5 is movable in the up-and-down direction by a driving means (not illustrated). The lower partitioning frame 4 and the bottom wall of the container 2 are secured in a liquid-tight manner to prevent possible leakage of the electrolytic solution 19 therebetween.

The lower partitioning frame 4 is constituted by longitudinal partition walls 11 and transverse partition walls 11 connected in an orthogonally-crossed manner to form a plurality of individual chambers 9 in an approximate grid-shaped manner in a plane view (see FIGS. 1 to 3). At the upper end of the partition wall 11 of the lower partitioning frame 4, a first contact plate portion 12 is provided (see FIG. 3). The upper surface of the first contact plate portion 12 is formed into a smooth surface. The width W1 of the upper surface of the first contact plate portion 12 is larger than the thickness T1 of the partition wall 11 of the lower partitioning frame 4 (see FIG. 3).

The upper partitioning frame 5 is constituted by longitudinal partition walls 13 and transverse partition walls 13 connected in an orthogonally-crossed manner to form a plurality of individual chambers 9 in an approximate grid manner in a plane view (see FIGS. 1 to 3). The number, the size in a plane view, and the arrangement of the individual chambers 9 of the upper partitioning frame 5 are the same as the number, the size in a plane view, and the arrangement of the individual chambers 9 of the lower partitioning frame 4 (see FIGS. 1 to 3). At the lower end of the partition wall 13, a second contact plate portion 14 is provided (see FIG. 3). The lower surface of the second contact plate portion 14 is formed into a smooth surface. The width W2 of the lower surface of the second contact plate portion 13 is larger than the thickness T2 of the partition wall 13 of the upper partitioning frame 5 (see FIG. 3).

In this embodiment, the plurality of individual chambers 9 are arranged in a grid-shaped manner, but the arrangement is not limited to it. For example, a honeycomb arrangement can be employed.

Figure 6:
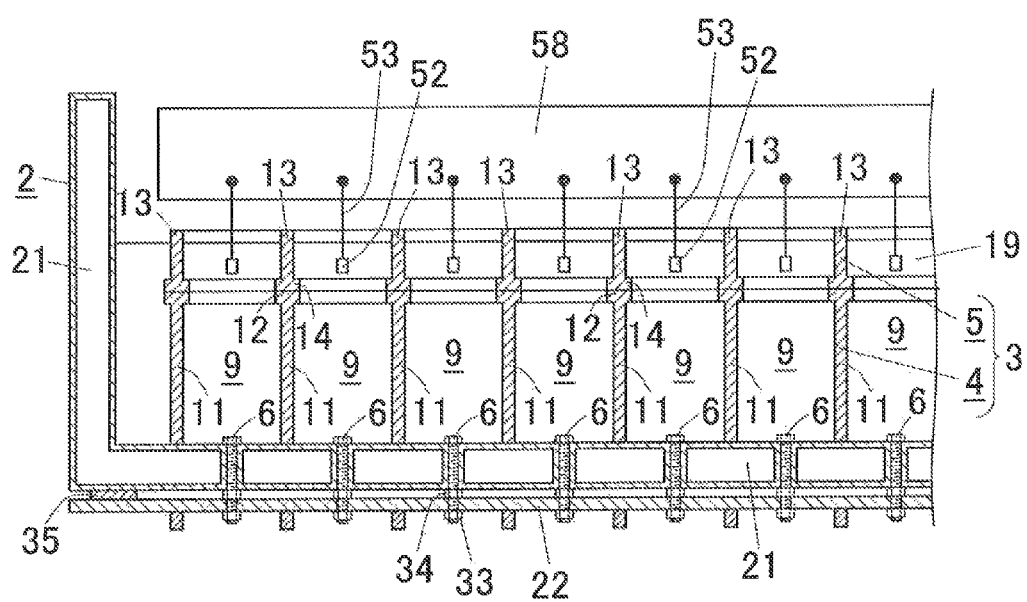
FIG. 6 is a partial cross-sectional view showing an arrangement of the capacitor element manufacturing jig with respect to the capacitor element manufacturing container at the time of passing electricity.

By arranging the upper partitioning frame 5 on the upper surface of the lower partitioning frame 4 in a state in which the lower surface of the second contact plate portion 14 of the upper partitioning frame 5 is in contact with the upper surface of the first contact plate portion 12 of the lower partitioning frame 4, the inner space of the container 2 can be partitioned into a plurality of individual chambers 9 in a liquid-tight manner (in such a manner that no liquid leakage occurs between the individual chambers) (see FIG. 6). On the other hand, from such a stacked state, by moving the upper partitioning frame 5 upward to detach the upper partitioning frame 5 from the lower partitioning frame 4 toward the upper side, a passage 8 can be formed between the lower partitioning frame 4 and the upper partitioning frame 5 (between the first contact plate portion 12 and the second contact plate portion 14) (see FIG. 3). As explained above, in this embodiment, the partitioning frame 3 includes the lower partitioning frame 4 protruded form the bottom surface of the container 2 and the upper partitioning frame 5 capable of coming into contact with the upper surface of the lower partitioning frame 4, and the upper partitioning frame 5 is movable in the up-and-down direction. Thus, the reaction container is provided with an openable and closable passage 8 which enables movable of the electrolytic solution between the plurality of individual chambers 9 when the passage is opened, and also enable to partition the plurality of individual chambers 9 in the container 2 in a liquid-tight manner when the passage is closed. In other words, by arranging the upper partitioning frame 5 on the upper surface of the lower partitioning frame 4, the passage 8 is closed (see FIG. 6), while by detaching the upper partitioning frame 5 upward from the lower partitioning frame 4, the passage 8 is opened (see FIG. 3). When the passage 8 is opened, the electrolytic solution can move between one of the individual chambers and all adjacent individual chambers.

The upper and lower pair of walls forming the liquid passing space 21 in the bottom wall of the container 2 are provided with through-holes 36 round in a plane view at corresponding positions in the up-and-down direction (see FIG. 3). A cylindrical pipe 31 is inserted from the through-hole 36 of the upper wall to the through-hole 36 of the lower wall in a fitted manner. To prevent possible leakage of temperature adjusting liquid flowing in the liquid passing space 21, the gaps between the inner peripheral walls of the through-holes and the outer peripheral walls of the end portions of the pipe 31 are sealed by sealing resin 32, such as, e.g., silicone resin (see FIG. 3).

A circuit board 22 is arranged at the bottom side of the container 2. In detail, the circuit board 22 is fixed to the lower surface of the bottom wall of the container 2 via spacers 35 (see FIG. 3).

Figure 4:
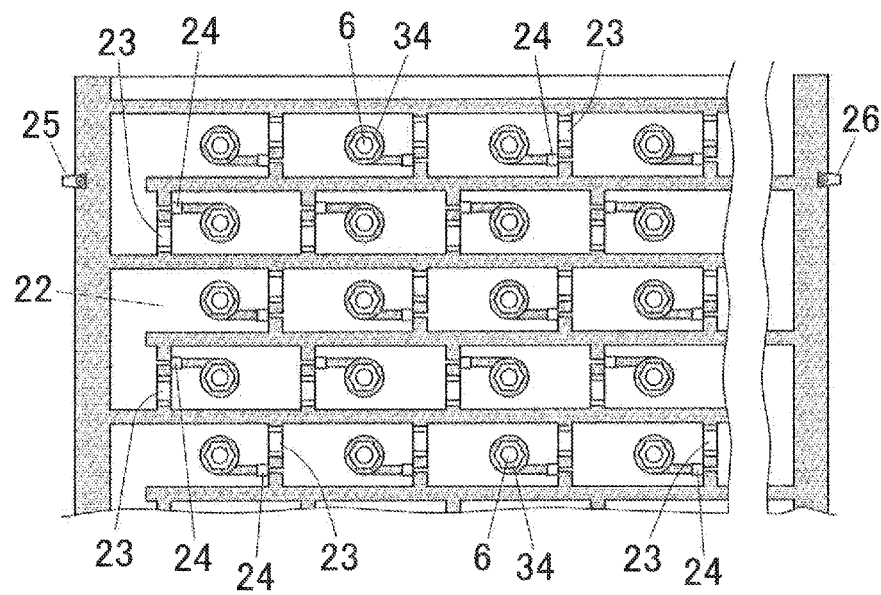
FIG. 4 is a top view of the circuit board.

On the upper surface of the circuit board 22, as shown in FIG. 4, en electric circuit having a pair of electric connection terminals 25 and 26 is formed. One of the electric connection terminals 25 is provided at one end portion of the circuit board 22, while the other electric connection terminal 26 is provided at the other end portion of the circuit board 22. One of the electric connection terminals is a current limiting terminal, and the other is a voltage limiting terminal 26.

As the circuit board 22, an insulating board is used. The material of the insulating board is not specifically limited, and can be, for example, glass epoxy resin, imide resin, and ceramic. The electric circuit is formed by, for example, copper foils.

Figure 7:
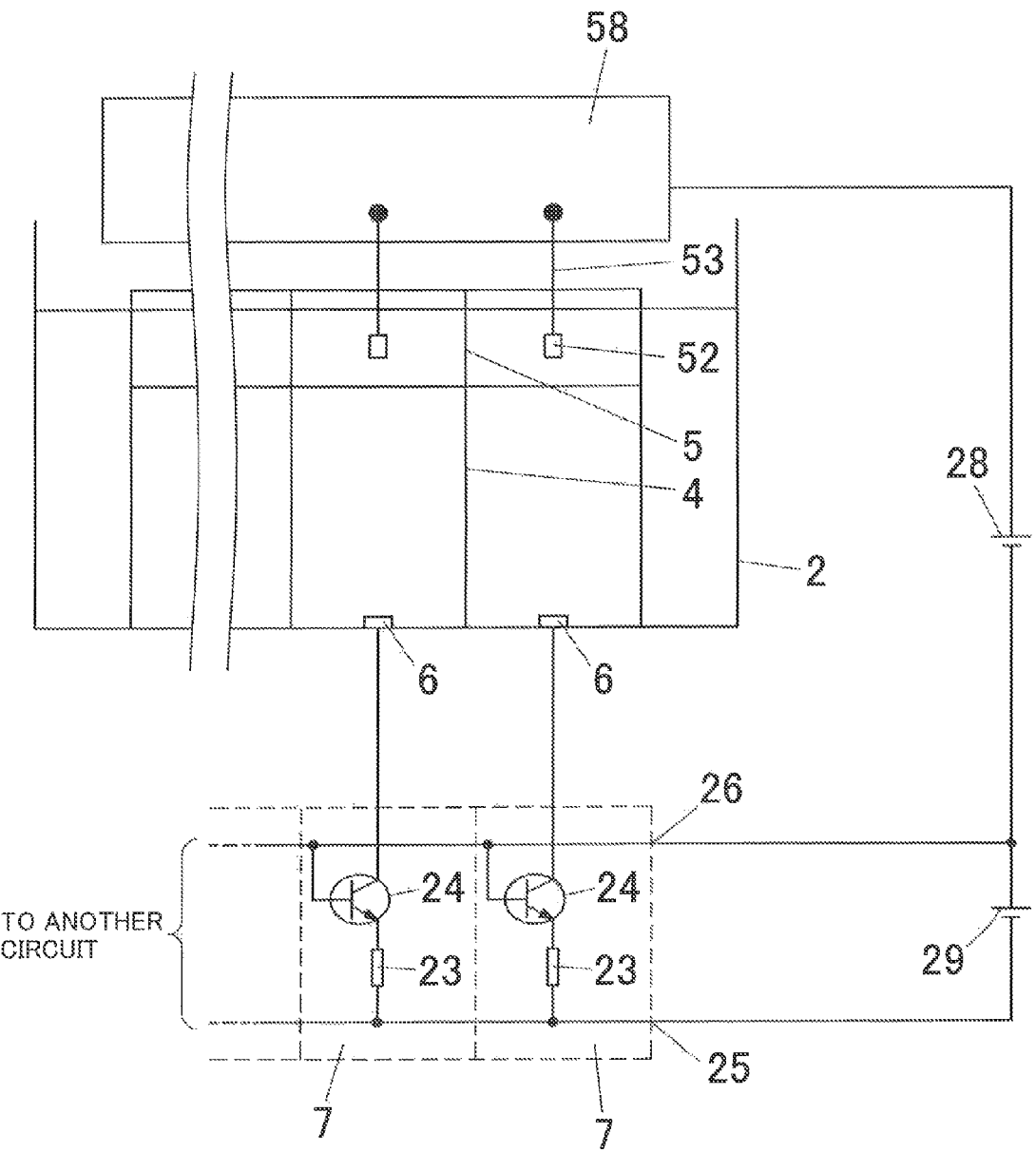
FIG. 7 is an electrical circuit diagram showing an electric circuit of the circuit board (only two circuits are shown)

The circuit board 22 is provided with resistors 23 and transistors 24 on the upper surface of the circuit board (see FIGS. 3 and 4). As shown in the electric diagram shown in FIG. 7, one end of the resistor 23 is connected to the current limiting terminal 25, and the emitter of the transistor 24 is connected to the other end of the resistor 23. The cathode member 6 is connected to the collector of the transistor 24, and the base of the transistor 24 is connected to the voltage limiting terminal 26. The cathode member 6 is connected to the voltage and current controllable power source 7 as shown in FIGS. 4 and 7. In the present invention, the power source 7 capable of controlling the voltage and the current of the circuit board 22 is preferably constituted by a constant current source as shown in FIG. 7, but not limited to it.

The circuit board 22 includes a plurality of through-holes 27 penetrating in the up-and-down direction (see FIG. 3) These through-holes 27 are provided in the same arrangement as the through-holes 36 of the bottom wall of the container 2 (the intervals in the longitudinal direction are the same, and the intervals in the transverse direction are the same).

Figure 5:
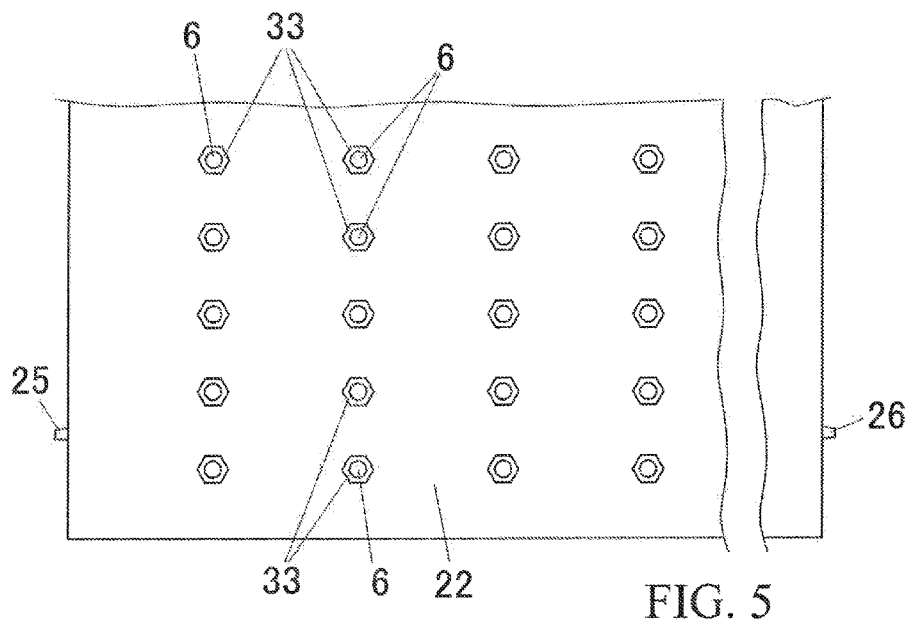
FIG. 5 is a bottom view of the circuit board.

As shown in FIG. 3, the shaft portion 6B of the cathode member 6 made of a bolt is inserted into the through-holes 36 of the bottom walls of the container 2 from the above and further inserted into the through-hole 27 of the circuit board 22, and a first nut 33 is screwed and tightened to the tip end portion of the bolt shaft 6B downwardly protruded from the through-hole 27 of the circuit board 22. Thus, the circuit board 22 is fixed to the bottom surface side of the container 2, and the head portion 6A of the bolt is protruded from the bottom surface in each individual chamber 9 and constituted as the cathode member 6 (see FIGS. 3 and 5). As explained above, in each individual chamber 9, the cathode members 6 are arranged individually (FIGS. 2 and 3). A second nut 34 is screwed to the shaft portion 6B of the cathode member 6 between the bottom wall of the container 2 and the circuit board 22 in such a manner that the nut electrically contacts the electric circuit on the upper surface of the circuit board 22. In other words, the cathode member 6 electrically contacts the electrical circuit on the upper surface of the circuit board 22 via the second nut 34 (see FIG. 4).

Next, a method of manufacturing a capacitor element using the aforementioned capacitor element manufacturing reaction container 1 will be explained. In FIG. 6, one example of the manufacturing method of a capacitor element according to the present invention is shown.

As shown in FIG. 3, a member in which the basal end of the lead wire 53 is connected to the conductive member (anode member) 52 and the tip end of the lead wire 53 is connected to one widthwise end portion (i.e., the lower end portion) of an elongated metal plate (capacitor element manufacturing jig) 58 is provided.

Electrolytic solution 19 is poured in the container 2 of the capacitor element manufacturing reaction container 1 in which the upper partitioning frame 5 is detached from the lower partitioning frame 4 as shown in FIG. 3. As the electrolytic solution 19, chemical conversion treatment solution for forming a dielectric layer 54 and semiconductor layer forming solution or the like for forming a semiconductor layer 55 can be exemplified.

Next, the upper partitioning frame 5 is moved downward so that the lower surface of the second contact plate portion 14 of the upper partitioning frame 5 is brought into contact with the upper surface of the first contact plate portion 12 of the lower partitioning frame 4 protruded upward from the bottom surface of the container 2 to arrange the upper partitioning frame 5 on the lower partitioning frame 4 (that is, so that the passage 8 is brought into the closed state), to thereby partition the inner space of the container 2 into a plurality of individual chambers 9 (see FIG. 6). At this time, it is preferable to adjust the amount of the electrolytic solution 19 so that the liquid level of the electrolytic solution 19 is positioned above the upper surface of the lower partitioning frame 4 but lower the upper surface of the upper partitioning frame 5 (see FIG. 6). With this partitioning, it becomes possible to secure the liquid-tight state in which no movement of the electrolytic solution is allowed between the adjacent individual chambers 9.

Next, the elongated metal plate 58 (capacitor element manufacturing jig) to which the conductive members 52 (anode members) are set is arranged at a position above the container 2 of the capacitor element manufacturing reaction container 1. From this state, the elongated metal plate 58 is lowered until at least apart of (normally, the entirety of) the conductive member 52 (anode member) is immersed in the electrolytic solution 19 and fixed the elongated metal plate 58 at the height position (see FIG. 6).

At this time, it is preferable that, in a state in which a plurality of elongated metal plates 58 each having the anode members 52 are arranged in parallel, the plurality of elongated metal plates 58 are suspended from and fixed to an elongated holding frame (not illustrated) made of metal such as stainless steel and the elongated holding frame is lowered to thereby lower the elongated metal plates 58. Each anode member 52 is electrically connected to the elongated holding frame via the lead wire 53 and the elongated metal plate 58.

Figure 8:
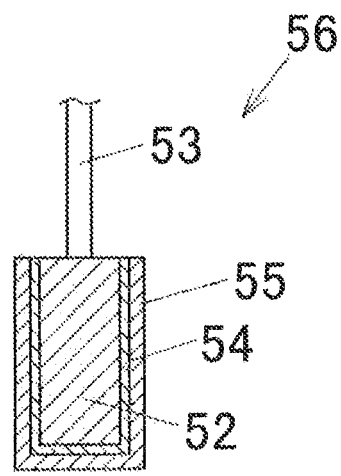
FIG. 8 is a partial cross-sectional view showing an embodiment of the capacitor element manufactured by the manufacturing method according to the present invention.

Next, in the immersed state of the conductive members (anode members) 52, electric current is passed between the conductive member 52 as an anode and each cathode member 6 arranged in the electrolytic solution 19 in each individual chamber 9. By using chemical conversion treatment solution as first electrolytic solution 19, a dielectric layer 54 (see FIG. 8) can be formed on the surface of the conductive member 52 by applying current (dielectric layer forming step).

The maximum value of the voltage to be applied to the anodic member (conductive member) 52 can be set by the voltage applied between the elongated plate holding frame and the voltage limiting terminal 26. The maximum value of the current to be applied to the anode member (conductive member) 52 can be set by the voltage applied between the voltage limiting terminal 26 and the current limiting terminal 25.

During the dielectric layer forming step, the passage 8 of the capacitor element manufacturing reaction container 1 is opened once or plural times periodically, or irregularly. In other words, the upper partitioning frame 5 is moved upward to detach the upper partitioning frame 5 from the lower partitioning frame 4 to thereby form the passage 8 between the partitioning frames 4 and 5 (i.e., the closed passage 8 is opened). With this, the chemical conversion treatment solution 19 can be moved between the adjacent individual chambers 9. As a result, the liquid levels of the chemical conversion treatment solution 19 in the individual chambers (compartments) 9 can be adjusted to the same height (the same level) (see FIG. 3). Thus, the forming region of the dielectric layer 54 in each conductive member 52 can be kept constant (First liquid level adjusting step). The first liquid level adjusting step can be performed periodically or irregularly each after repeating the dielectric layer forming step one to plural times.

Next, the chemical conversion treatment solution 19 is removed from the container 2. The conductive members (anode members) 52 each having the dielectric layer 54 are taken out from the container, water washed, and dried, depending on the needs. Thereafter, semiconductor layer forming solution 19 is newly introduced into the container 2.

Next, the upper partitioning frame 5 is lowered to arrange the upper partitioning frame 5 on the lower partitioning frame 4 so that the lower surface of the second contact plate portion 14 of the upper partitioning frame 5 is brought into contact with the upper surface of the first contact plate portion 12 of the lower partitioning frame 4 protruded upward from the bottom surface of the container 2 (i.e., the passage 8 is closed), to thereby partition the inside of the container 2 into a plurality of individual chambers 9 (see FIG. 6). At this time, it is preferable to adjust the amount of the semiconductor layer forming solution such that the liquid level of the semiconductor layer forming solution 19 takes a position above the upper surface of the lower partitioning frame 4 and below the upper surface of the upper partitioning frame 5 (see FIG. 6). With such partitioning, it becomes possible to secure the liquid-tight state in which the semiconductor layer forming solution 19 cannot move between the adjacent individual chambers 9.

Next, the elongated metal plate 58 to which conductive members (anode members) 52 each having the dielectric layer 54 formed on the surface thereof is arranged at the position above the container 2 of the semiconductor element manufacturing reaction container 1 and then lowered until at least a part of (normally, the entirety of) the conductive member (anode member) 52 is immersed in the semiconductor layer forming solution 19, and then the elongated metal plate 58 is fixed at the height position (see FIG. 6).

Next, in the immersed state of the conductive member (anode member) 52, by passing electric current between the conductive member 52 as an anode and each cathode member 6 arranged in the semiconductor layer forming solution 19 in each individual chamber 9 as a cathode, i.e., energizing using the semiconductor layer forming solution as second treatment solution 19, a semiconductor layer 55 can be laminated on the surface of the dielectric layer 54 formed on the surface of the conductive member 52 (semiconductor layer forming step). Thus, a capacitor element 56 in which a dielectric layer 54 is formed on the surface of the conductive member 52 and a semiconductor layer 55 is laminated on the surface of the dielectric layer 54 can be manufactured (see FIG. 8).

During the semiconductor layer forming step, the passage 8 of the capacitor element manufacturing reaction compartment 1 is opened once or plural times periodically, or irregularly. In other words, the upper partitioning frame 5 is moved upward to detach the upper partitioning frame 5 from the lower partitioning frame 4 to thereby form the passage 8 between the partitioning frames 4 and 5 (i.e., the closed passage 8 is opened). With this, the semiconductor layer forming solution 19 can be moved between the adjacent individual chambers 9. As a result, the liquid levels of the chemical conversion treatment solution 19 in the individual chambers (compartments) 9 can be adjusted to the same height (the same level) (see FIG. 3). Thus, the forming region of the semiconductor layer 55 can be kept constant (Second liquid level adjusting step). The second liquid level adjusting step can be performed periodically or irregularly each after repeating the semiconductor layer forming step one to plural times.

According to the manufacturing method of a capacitor element of the present invention, in a state in which the current passing each conductive member (anode member) 52 arranged in each individual chamber (compartment) of the reaction container can be precisely controlled to a predetermined constant current value. This enables uniform formation of the dielectric layer 54 and semiconductor layer 55 to the plurality of conductive members (anode members) 52. Further, by opening the passage 8 of the partitioning frame 3, the liquid level in each individual chamber (compartment) 9 can be adjusted to the same height (the same level) to maintain a constant forming range of the dielectric layer and semiconductor layer on each conductive member (anode member) 52, which enables to manufacture a number of uniform capacitor elements 56.

In the aforementioned embodiment, the up-and-down movement of the upper partitioning frame 5 and the up-and-down movement of the elongated metal plate (capacitor element manufacturing jig) 58 to which the conductive members 52 are attached are performed separately, but not limited to it. For example, it can be configured such that the upper partitioning frame 5 and the elongated metal plate (capacitor element manufacturing jig) 58 are integrally formed and that the upper partitioning frame 5 and the elongated metal plate 58 are simultaneously moved in the up-and-down direction with a single elevating means. In this case, there is a merit that the number of elevating means can be one. Alternatively, at the time of immersing the conductive members 52 connected to the elongated metal plate 58 in the electrolytic solution, it can be configured such that the upper partitioning frame 5 in which a part thereof is positioned below the liquid level is lowered with an elevating means.

In the aforementioned embodiment, it is constituted that the partitioning frame 3 includes a lower partitioning frame 4 secured to the bottom wall of the container 2 and the upper partitioning frame 5, but the partitioning frame 3 is not limited to it. For example, it can be constituted such that the lower partitioning frame 4 is omitted. In this case, in order to secure the liquid-tight state which causes no liquid leakage when the lower surface of the upper partitioning frame 5 which is movable in the up-and-down direction is in contact with the upper surface of the bottom wall of the container 2, the lower surface of the upper partitioning frame 5 and the upper surface of the bottom wall of the container 2 are each formed into a smooth surface. In cases where the partitioning frame 3 is constituted only by the upper partitioning frame 5 movable in the up-and-down direction, there is a merit that the liquid such as the electrolytic solution can be easily discharged.

The conductive member 52 is not specifically limited. For example, at least one of conductive members selected from the group consisting of valve action metal and conductive oxide of the valve action metal can be exemplified. The concrete examples thereof include aluminum, tantalum, niobium, titan, zirconium, niobium monoxide, and zirconium monoxide.

The shape of the conductive member 52 is not specifically limited, and can be, for example, a foil-like shape, a plate-like shape, a bar-like shape, and a rectangular parallelepiped shape.

The chemical conversion treatment solution 19 is not specifically limited, and can be, for example, solution in which conventionally known electrolytic solution, such as, e.g., organic acid or its salt (for example, adipic acid, acetic acid, ammonium adipate, benzoic acid), inorganic acid or its salt (for example, phosphoric acid, silicic acid, ammonium phosphate, ammonium silicate, sulfuric acid, and ammonium sulfate) is dissolved or suspended. By energizing using such chemical conversion treatment solution, a dielectric layer 54 containing insulating metallic oxide, such as, e.g., $Ta_2O_5$, $Al_2O_3$, $Zr_2O_3$, or $Nb_2O_5$, can be formed on the surface of the conductive member 52.

It can be configured such that the conductive member 52 having the dielectric layer 54 formed on the surface thereof is subjected to the semiconductor layer forming step by omitting the dielectric layer forming step using such chemical conversion treatment solution. The dielectric layer 54 on the surface can be, for example, a dielectric layer having at least one element as a main component selected from insulating oxides, or a dielectric layer known in the field of ceramic capacitors or film capacitors.

The semiconductor layer forming solution 19 is not specifically limited as long as it is solution capable of forming a semiconductor layer by energization, and can be, for example, solution containing aniline, thiophene, pyrrole, methylpyrrole and its substituted derivative thereof (for example, 3,4-ethylenedioxythiophene). Dopant can be further added to the semiconductor layer forming solution 19. The dopant is not specifically limited, and can be any known dopant, such as, e.g., arylsulfonic acid or its salt, alkyl sulfonic acid or its salt, or various polymer sulfonic acid. By energizing using such semiconductor layer forming solution 19, a semiconductor layer 55 made of, for example, conducting polymer (for example, polyaniline, polythiophene, polypyrrole, polymethylpyrrole) can be formed on the surface of the dielectric layer 54 formed on the surface of the conductive member 52.

In the present invention, an electrode layer can be formed on the semiconductor layer 55 of the capacitor element 56 obtained by the aforementioned manufacturing method to enhance the electric contact to a pullout lead (for example, a lead frame) of a capacitor.

The electrode layer can be formed by, for example, solidification of conductive paste, plating, metal evaporation, or formation of a heat-resistance conductive resin film. The conductive paste is preferably silver paste, copper paste, aluminum paste, carbon paste, nickel paste, or the like. The paste can be one of them or two or more of them. In the case of using two or more conductive pastes, they can be mixed, or can be laminated to form separate layers.

Electric terminals are electrically connected to the conductive member 52 and the semiconductor layer 55 of the capacitor element 56 obtained as mentioned above (for example, a lead wire 53 is welded to one of electric terminals, and the electrode layer (semiconductor layer) 55 is welded to the other electric terminal), and sealed except for a part of the electric terminal. Thus, a capacitor is obtained.

The sealing method is not specifically limited, and can be, for example, resin mold covering, resin case covering, metal case covering, resin dipping covering, or laminate film covering. Among them, resin mold covering is preferable since the miniaturization and cost reduction can be easily performed.

EXAMPLES

Next, concrete examples of the present invention will be explained, but it should be noted that the present invention is not limited to one of them.

Example 1

Production of Anode Member (Conductive Member) 52

Niobium power having an average particle diameter of 125 μm was obtained by granulating niobium primary powder (average grain diameter of 0.17 μm) obtained by pulverizing a niobium (Nb) ingot using the hydrogen brittleness. Next, the obtained niobium powder was partially nitrided to obtain partially nitrided niobium powder (oxygen content: 6,500 mass ppm, nitrogen content: 7,600 ppm, CV value: 280,000 μF·V/g). The partially nitrided niobium powder was molded together with a niobium wire (lead wire) having a diameter of 0.29 mm, and then vacuum sintered at 1,240° C. to obtain a sintered body (anode member) 52 of a rectangular parallelepiped shape having a length of 2.3 mm, a width of 1.7 mm, a thickness of 1.0 mm, and a mass of 15.2 mg. The niobium lead wire 53 was buried approximately in the center of the surface of 1.7 mm×1.0 mm, and integrally formed with the sintered body 52 such that the lead wire 53 was outwardly extended from the surface by 10 mm. A washer of tetrafluoroethylene having an inner diameter of 0.26 mmφ), an outer diameter of 0.80 mmφ, a thickness of 0.20 mm was attached to the lead wire 53 of the anode member 52 away from the lead wire 53 mounting surface by 0.15 mm.

[Production of Elongated Metal Plate 58 Equipped with Anode Members 52]

As shown in FIGS. 1 and 3, an elongated metal plate (capacitor element manufacturing jig) equipped with anode members 52 was manufactured. Initially, the tip end portion of the lead wire 53 of the anode member (conductive member) 52 was connected by welding to the lower end portion of the stainless steel elongated metal plate 58 having a length (horizontal length) of 200 mm, a width (vertical length) of 30 mm, and a thickness of 2 mm. A total of 32 pieces of anode members 52 were connected at the intervals of 5 mm between adjacent lead wires 53 (figures are simplified by reducing the number of anode members). Next, a total of 20 pieces of the elongated plate holding frames 58 having the anode members 52 were arranged in parallel at an intervals of 8 mm and suspended from and fixed to a stainless steel elongated plate holding frame. With this, the anode members 52 are electrically connected to the elongated plate holding frame vial the lead wire 53 and the elongated metal plate 58. A total of 640 pieces of anode members 52 were arranged under the elongated plate holding frame with the arrangement of 32 by 20.

[Capacitor Element Manufacturing Reaction Container]

The aforementioned capacitor element manufacturing reaction container 1 shown in FIGS. 1 to 3 was prepared. As the container 2, an acrylic resin container of a rectangular parallelepiped shape having a length of 240 mm, a width of 300 mm, and a height of 130 mm was used. The container 2 was configured such that heated water (heated water for controlling the electrolytic solution) was passed through the liquid passing space 21 formed in the four side wall and the bottom wall. The container was provided with a total of 640 individual chambers (compartments) 9 in the arrangement of 32 by 20 formed by the partitioning frame 32. The lower partitioning frame 4 was a grid-shaped frame of acrylic resin, and was 50 mm in height, 2 mm in thickness T1 of the partition wall 11, 3 mm in width W1 of the first contact plate portion 12 (see FIG. 3). The upper partitioning frame 5 was a grid-shaped frame of acrylic resin, and 20 mm in height, 2 mm in thickness T2 of the partition wall 13, and 3 mm in the width W2 of the second contact plate portion 14 (see FIG. 3). The cathode member 6 was a stainless steel bolt having a shaft external diameter of 1 mm and the head outer diameter of 2 mm.

At the bottom surfaced side of the container 2, a copper coated glass epoxy board (circuit board) 22 having approximately the same size as the bottom surface of the container 2 and a thickness of 1.6 mm was fixedly arranged with stainless bolts (cathode members) 6 at a distance of 0.8 mm from the lower surface of the container 2.

On the upper surface of the circuit board 22, as shown in FIGS. 4 and 7, each cathode member (bolt) 6 was electrically connected to each of a total of 640 current and voltage controlling circuits. The resistors 23 (20 kΩ±0.5%) and transistors 24 (2SC6026GR) were in contact with the bottom surface (i.e., the bottom wall through which heated water was passed) of the container 2 via a thermal conductive resin sheet (not illustrated).

[Formation of Dielectric Layer (Chemical Conversion Treatment)]

The upper partitioning frame 5 of the capacitor element manufacturing reaction container 1 was moved upward to make a gap (passage) 8 of 0.2 mm between the upper partitioning frame 5 and the lower partitioning frame 4. With this state, chemical conversion treatment solution 19 of 2 mass % phosphoric acid aqueous solution was poured in the container 2 to a depth of 60 mm (see FIG. 3). By adjusting the temperature of heated water passing through the liquid passing space 21 of the container 2, the temperature of the chemical conversion treatment solution 19 was maintained at 65° C. By lowering the elongated plate holding frame with a elevating means, the anode member 52 was arranged so that the upper edge (lead wire embedded surface) was positioned at a depth of 5 mm from the liquid level. Next, the upper partitioning frame 5 was lowered slowly so as not to cause waves to bring the lower surface of the second contact plate portion 14 of the upper partitioning frame 5 into contact with the upper surface of the first contact plate portion 12 of the lower partitioning frame 4 to thereby close the passage 8. Thus, the inside of the container 2 was partitioned into 640 individual chambers 9 (see FIG. 6).

Next, it was set that the maximum voltage applied to the anode member 52 became 10 V (the voltage controlling terminal was held at a voltage of about −9.2 V with respect to the elongated plate holding frame by a DC power source) and that the maximum current per each anode member 52 was also set to 2 mA (the current controlling terminal was held at a voltage of about −40.6 V with respect to the voltage controlling terminal by a DC power source 29), and chemical conversion treatment was initiated.

Every 15 minutes after the initiation of the chemical conversion treatment, the upper partitioning frame 5 was raised by 0.5 mm so as not to cause any waves to form a gap 8 (passage) of 0.5 mm between the upper partitioning frame 5 and the lower partitioning frame 4 for about 1 second (i.e., the passage 8 was opened for about 1 second) (see FIG. 3). By repeating such liquid level adjusting step every 15 minutes, the liquid level between the individual chambers 9 (compartments) was adjusted to the same height. Energization was suspended only while the gap 8 (passage) was formed. Such chemical conversion treatment was performed for 240 minutes to form a dielectric layer 54 on the surface of the conductive member 52.

After completion of the chemical conversion treatment, in the immersed state in the chemical conversion treatment solution, leak current on each anode member 52 (solution LC value after completion of the chemical conversion treatment) was measured. The amount of leak current was measured with a potential of −10 V applied to the tip end of the shaft portion 6B of the cathode member 6 with respect to the elongated plate holding frame. This measurement of the leak current was performed in a state in which a potential of −10 V with respect to the elongated plate holding frame was applied to both the voltage limiting terminal 26 and current limiting terminal 25. The results of the measurements revealed that the solution LC values after completion of the chemical conversion treatment of 640 anode members were within the range of 29 to 33 μA.

[Formation of Semiconductor Layer (Electrolytic Polymerization Treatment)],

Next, after immersing in 20 mass % iron xylene sulfonate aqueous solution, the chemical conversion treated conductive member (anode member) 52 was dried to eliminate water. After the series of immersion operation and drying operation were repeated 5 times. Then, the conductive member (anode member) 52 was immersed in 50 mass % ethylenedioxythiophene ethanol and then dried in air to remove ethanol.

Next, the upper partitioning frame 5 of the capacitor element manufacturing reaction container 1 was moved upward to obtain a 0.2 mm gap (passage) 8 between the upper partitioning frame 5 and the lower partitioning frame 4. In this state, mixed aqueous solution (semiconductor layer forming solution) 19 of a composition including ethylene glycol 25 mass %, anthraquinone sulfonic acid 0.5 mass %, and ethylenedioxy thiophene 0.5 mass % was poured in an empty container 2 to a depth of 60 mm (see FIG. 3). By adjusting the temperature of heated water passing through the liquid passing space 21 of the container 2, the temperature of the semiconductor layer forming solution 19 was maintained at 26° C. By lowering the elongated plate holding frame by an elevating means, the conductive member (anode member) 52 having a dielectric layer 54 formed on the surface thereof by the chemical conversion treatment was immersed in the semiconductor layer forming solution 19 so that the lower surface of the washer mounted on the lead wire 53 became the same level as the liquid level of the semiconductor layer forming solution 19. Next, the upper partitioning frame 5 was lowered slowly so as not to cause waves to bring the lower surface of the second contact plate portion 14 of the upper partitioning frame 5 into contact with the upper surface of the first contact plate portion 12 of the lower partitioning frame 4 to thereby close the passage 8. Thus, the inside of the container 2 was partitioned into 640 individual chambers 9 (see FIG. 6).

Next, it was set that the maximum voltage applied to the anode member 52 became 13 V (the voltage controlling terminal was held at a voltage of about −12.3 V with respect to the elongated plate holding frame by a DC power source) and that the maximum current per each anode member 52 was also set to 100 μA (the current controlling terminal was held at a voltage of about −2.6 V with respect to the current controlling terminal by a DC power source 29), and electrolytic polymerization was initiated.

Every 15 minutes after the initiation of the electrolytic polymerization, the upper partitioning frame 5 was raised by 0.5 mm so as not to cause any waves to form a gap 8 (passage) of 0.5 mm between the upper partitioning frame 5 and the lower partitioning frame 4 for about 1 second (i.e., the passage 8 was opened for about 1 second) (see FIG. 3). By repeating such liquid level adjusting step every 15 minutes, the liquid level between the individual chambers 9 (compartments) was adjusted to the same height. Energization was suspended only while the gap 8 (passage) was formed. Such electrolytic polymerization was performed for 60 minutes.

Next, the capacitor element 56 was pulled out of the semiconductor layer forming solution 19, and the semiconductor layer forming solution adhered when immersed in ethanol was washed and removed. Thereafter, the capacitor element was dried in air and the ethanol was removed.

A series of operations including immersion in the semiconductor layer forming solution 19, electrolytic polymerization, ethanol washing, and drying in air were further repeated three times (a total 4 times). The set value of the maximum current at the time of electrolytic polymerization was 120 μA at the second time, 180 μA at the third time, and 185 μA at the fourth time.

[Chemical Reconversion Treatment]

Using the aforementioned capacitor element manufacturing reaction container 1, in the same manner as in the aforementioned chemical conversion treatment, chemical reconversion treatment was performed. However, using 3 mass % phosphoric acid aqueous solution as the chemical conversion treatment solution, the maximum voltage applied to the anode member was set to 7 V, and the maximum current per each anode member was set to 1 mA, and the chemical conversion treatment time was set to 15 minutes. Thereafter, the anode member was pulled out of the chemical conversion treatment solution, rinsed in water, and dried.

[Production of Electrolytic Capacitor]

Carbon paste and silver paste were applied sequentially to the anode member obtained through the chemical reconversion treatment mentioned above and solidified in a laminated matter to thereby obtain a capacitor element 56. The capacitor element 56 was subjected to lead frame attachment, sealing, aging, frame cutting and bending work, and electric measurement. Thus, 640 pieces of chip-shaped solid conductive members having a size of 3.5 mm×2.8 mm×1.8 mm, a rated voltage of 2.5 V, and a capacity of 330 μF were manufactured.

The obtained 640 pieces of solid conductive members fell within the rage of ESR: 14 mΩ to 20 mΩ (average: 17 mΩ), and the leak currents (LC values) 30 seconds after applying 2.5 V were all less than 33 μA (0.04 CV).

Comparative Example 1

A total of 640 pieces of chip-shaped solid electrolytic capacitors were manufactured in the same manner as in Example 1 except that the chemical conversion treatment and the chemical reconversion treatment were performed in a state in which a gap (passage) 8 of 0.2 mm between the upper partitioning frame 5 and the lower partitioning frame 4 (without performing liquid level adjustment by closing the passage 8). The solution LC values at the time of completion of the chemical conversion treatment were within the range of 34 to 52 μA. The obtained 640 solid electrolytic capacitors were within the range of 15 mΩ to 21 mΩ in ESR (average: 18 mΩ). With respect to the leak currents (LC values) 30 seconds after applying 2.5 V, 24 pieces of electrolytic capacitors were 183 μA or more but less than 165 μA in LC value (0.1 VA or more but less than 0.2 CV), 581 pieces of electrolytic capacitors were 33 μA or more but less than 82.5 μA in LC value (0.04 CV or more but less than 0.1 CV), and 35 pieces of electrolytic capacitors were less than 33 μA in LC value (less than 0.04 CV).

Comparative Example 2

A total of 640 pieces of chip-shaped solid electrolytic capacitors were manufactured in the same manner as in Example 1 except that the chemical conversion treatment, electrolytic polymerization, and the chemical reconversion treatment were performed in a state in which a gap (passage) 8 of 0.2 mm between the upper partitioning frame 5 and the lower partitioning frame 4 (without performing liquid level adjustment by closing the passage 8). The solution LC values at the time of completion of the chemical conversion treatment were within the range of 33 to 49 µA. The obtained 640 solid electrolytic capacitors were within the range of 18 mΩ to 30 mΩ in ESR (average: 24 mΩ). With respect to the leak currents (LC values) 30 seconds after applying 2.5 V, 137 pieces of electrolytic capacitors were 83 µA or more but less than 165 µA in LC value (0.1 VA or more but less than 0.2 CV), 499 pieces of electrolytic capacitors were 33 µA or more but less than 82.5 µA in LC value (0.04 CV or more but less than 0.1 CV), and 4 pieces of electrolytic capacitors were less than 33 µA in LC value (less than 0.04 CV).

This application claims priority to Japanese Patent Application No. 2009-288710 filed on Dec. 21, 2009, and the entire disclosure of which is incorporated herein by reference in its entirety.

INDUSTRIAL APPLICABILITY

The capacitor element manufacturing reaction container according to the present invention can be preferably used as an electrolytic capacitor element manufacturing reaction container, but not specifically limited to such usage. A capacitor element obtained by the capacitor element manufacturing method of the present invention can be used as, for example, personal computers, server computers, cameras, game machines, DVDs, AV devices, digital devices such as, e.g., cellular phones, or electric devices, such as, e.g., various power sources.

DESCRIPTION OF THE REFERENCE NUMERALS

1 Capacitor element manufacturing reaction container
2 container
3 partitioning frame
4 lower partitioning frame
5 upper partitioning frame
6 cathode member
7 voltage and current controllable power source
8 passage
9 individual chamber
11 partition wall (of the lower partitioning frame)
12 first contact plate portion (lower partitioning frame)
13 partition wall (of the upper partitioning frame)
14 second contact plate portion (upper partitioning frame)
19 electrolytic solution (chemical conversion treatment solution, semiconductor layer forming solution, etc.)
21 liquid passing space
22 circuit board
23 resistor
24 transistor
25 current limiting terminal
26 voltage limiting terminal
52 anode member (conductive member)
54 dielectric layer
55 semiconductor layer
56 capacitor element
T1 thickness of the partition wall of the lower partitioning frame
T2 thickness of the partition wall of the upper partitioning frame
W1 width of the first contact plate portion
W2 width of the second contact plate portion

The invention claimed is:

1. A reaction container for manufacturing a capacitor element, comprising:
a container configured to accommodate electrolytic solution therein;
a partitioning frame configured to partition an inside of the container into a plurality of individual chambers;
cathode members individually disposed in each of the individual chambers; and
a passage provided in an openable and closable manner to allow movement of the electrolytic solution between one of the individual chambers and at least adjacent one of the individual chambers adjacent to the one of the individual chambers.

2. The reaction container for manufacturing a capacitor element as recited in claim 1, wherein
the partitioning frame includes a lower partitioning frame formed on a bottom surface of the container in an upwardly protruded manner and an upper partitioning frame configured to come into contact with an upper surface of the lower partitioning frame in a liquid-tight manner,
the upper partitioning frame is configured to move in an up-and-down direction,
the inside of the container is partitioned into a plurality of individual chambers by arranging the upper partitioning frame on the upper surface of the lower partitioning frame, and
the passage is formed between the two partitioning frames by detaching the upper partitioning frame from the lower partitioning frame.

3. The reaction container for manufacturing a capacitor element as recited in claim 2, wherein
a first contact plate portion is provided on an upper end of a partition wall of the lower partitioning frame, wherein an upper surface of the first contact plate portion is formed into a smooth surface and a width of the upper surface of the first contact plate portion is set to be larger than a thickness of the partition wall of the lower partitioning frame,
a second contact plate portion is provided on a lower end of a partition wall of the upper partitioning frame, wherein a lower surface of the second contact plate portion is formed into a smooth surface and a width of the lower surface of the second contact plate portion is set to be larger than a thickness of the partition wall of the upper partitioning frame, and
the inside of the container is partitioned into a plurality of individual chambers by arranging the upper partitioning frame on the upper surface of the lower partitioning frame in such a manner that the lower surface of the second contact plate portion of the upper partitioning frame is in contact with the upper surface of the first contact plate portion of the lower partitioning frame.

4. The reaction container for manufacturing a capacitor element as recited in claim 1, wherein a liquid passing space is provided inside a structural wall of the container.

5. The reaction container for manufacturing a capacitor element as recited in claim 1, further comprising a circuit board having a power supply capable of limiting voltage and electric current and electrically connected to the cathode member.

6. The reaction container for manufacturing a capacitor element as recited in claim 5, wherein the circuit board is arranged at a bottom surface side of the container.

7. The reaction container for manufacturing a capacitor element as recited in claims 5, wherein a component constituting the power supply is thermally connected to the container.

* * * * *